United States Patent [19]

Hsu

[11] Patent Number: 5,026,953
[45] Date of Patent: Jun. 25, 1991

[54] SCANNER SYSTEM WITH LOCAL SCANNING CAPABILITY FOR GRAPHIC READING

[75] Inventor: Danny Hsu, Taiwan, China
[73] Assignee: Wintime Technology Inc., Taipei, Taiwan
[21] Appl. No.: 495,993
[22] Filed: Mar. 20, 1990
[51] Int. Cl.⁵ .............................................. G08C 21/00
[52] U.S. Cl. ........................................ 178/19; 382/59; 382/13
[58] Field of Search ...................... 178/19, 18; 250/556, 250/271, 334; 382/58, 59, 80, 65, 67, 69, 13

[56] References Cited
U.S. PATENT DOCUMENTS
4,581,761   4/1986   Ichinokawa et al. ............. 178/19 X Primary Examiner—Stafford D. Schreyer
Attorney, Agent, or Firm—Fleit, Jacobson, Cohn, Price, Holman & Stern

[57] ABSTRACT

A scanner system with local scanning capability for graphic reading, which comprises a tablet, a scanner, a stylus or cursor control mouse and a main frame CPU. The scanner comprises a plurality of oscillators (induction coils) at both sides by the light source thereof to produce induced current on the plane of circuit of the tablet. The CPU of the tablet obtains the X,Y coordinate data of the oscillators through sample-and-hold amplifier circuit and A/D converter circuit. Simultaneously, the scanner projects light to reflect the picture to CCD so as to record the start and end location of every line. After a picture is read by the scanner the digital data of every line of the image and the X, Y coordinate data of the start and end location of every line of the image are stored in the storage of the main frame for further graphic data processing through its CPU so that any image distortion can be modified and local scanning can be achieved. The scanner is controlled to move by the tablet which provides a high resolution of 1000 lines per inch, such that the pitch between lines can be shortened, and a clear image can be obtained.

2 Claims, 3 Drawing Sheets

SCANNER SYSTEM WITH LOCAL SCANNING CAPABILITY FOR GRAPHIC READING

BACKGROUND OF THE INVENTION

The present invention relates to scanners for graphic reading and more particularly to a scanner system with local scanning capability for graphic reading which utilizes a tablet to drive a scanner, which comprises a plurality of coils and can be flexibly localized on the tablet for local scanning, to induce and reflect the graph, characters and lines of a reading target on the tablet permitting the tablet to register the coordinate data of the graph, characters and lines detected and to provide such coordinate data to a main frame CPU for processing so as to obtain a high resolution image of the reading target.

The conventional scanners or graphic reading are generally to utilize a light source to project light on a reading target to let the image of such a reading target be reflected through glasses to a CCD for further processing through a scanning circuit and a graphic digitizing circuit to provide corresponding digital data. The common disadvantage of the conventional graphic scanners is that the image obtained may be distorted or astigmatism problem may happen due to unstable moving speed or human error.

DISCLOSURE OF THE INVENTION

A graphic scanner system in accordance with the present invention includes a scanner having a plurality of oscillators at both sides by the light source thereof. When a tablet is induced by the oscillators, the plane of circuit of the tablet produces an induced current (Ampere right-hand law), and the CPU of the tablet immediately analyzes the induced current through a scanning circuit which is formed of multiplex decoder circuit, vertical and horizontal axes multiplex circuits to obtain the location of the induced current on the plane of circuit. The induced current is further treated through a sample-and-hold amplifier circuit and an A/D converter circuit to provide X, Y coordinate data corresponding to the location the tablet CPU detected. At the same time, the light source of the scanner projects light onto the reading target on the plane of circuit of the tablet to reflect the first line of the image of the reading target to a CCD module for further processing through a scanning circuit and a graphic digitizing circuit. The data of the first line scanned is sent to an input/output circuit. As soon as the scanner is moved to a second line, the position of the scanner is moved to a second line, the position of the oscillators of the scanner is changed accordingly, and the tablet simultaneously detects the change of X, Y coordinate data through the scanning circuit. Immediately after the detection of the coordinate data change, the tablet sends a pulse to inform the scanner of its movement to the location of the second line so that the scanner can start to read a new graphic data through the CCD module. As soon as an instruction is given to the main frame to receive the data, it fetches the digital data of every line of the image and the X, Y coordinate data of the start and the end of every line through an input/output circuit via an address bus, a data bus and a RD control line for storage in its storage and for further graphic data processing through its CPU so that the graphic data can be combined and any possible distortion of image can be eliminated. When the present system is used for local scanning, the main frame gives an instruction through the input/output circuit to drive the tablet CPU to shift its decoder circuit to the oscillator of a stylus. Then the stylus is used to draw a circle on the picture to define a region to scan. The tablet CPU immediately sends the coordinate data of the defined region to the main frame, and a control signal is further sent through the input/output circuit to the table CPU to shift its decoder circuit to the oscillators of the scanner so that the scanner can start scanning process.

According to the present invention, the scanner is controlled to move directly by the tablet. In comparison with the conventional roller controlled scanners which provide a resolution of 400 dots per inch maximum, a tablet can provide a resolution as high as 1000 lines per inch. Therefore, the pitch between lines can be shortened, and a clear image can be obtained.

Figure 1:
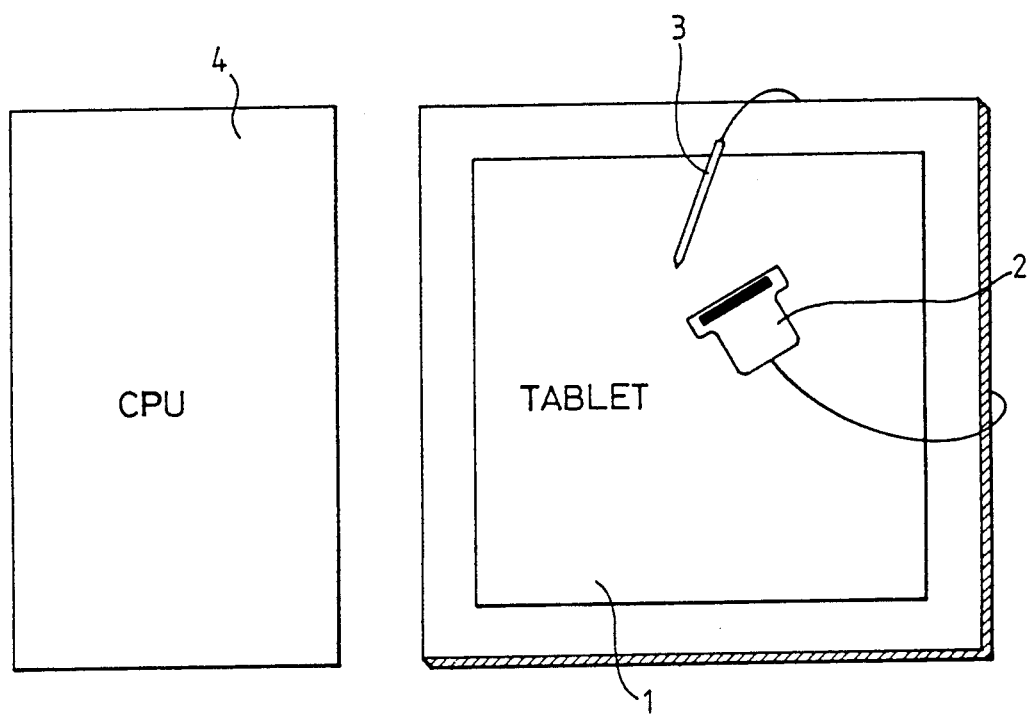
FIG. 1 is a structural assembly view of the present invention.
Figure 2:
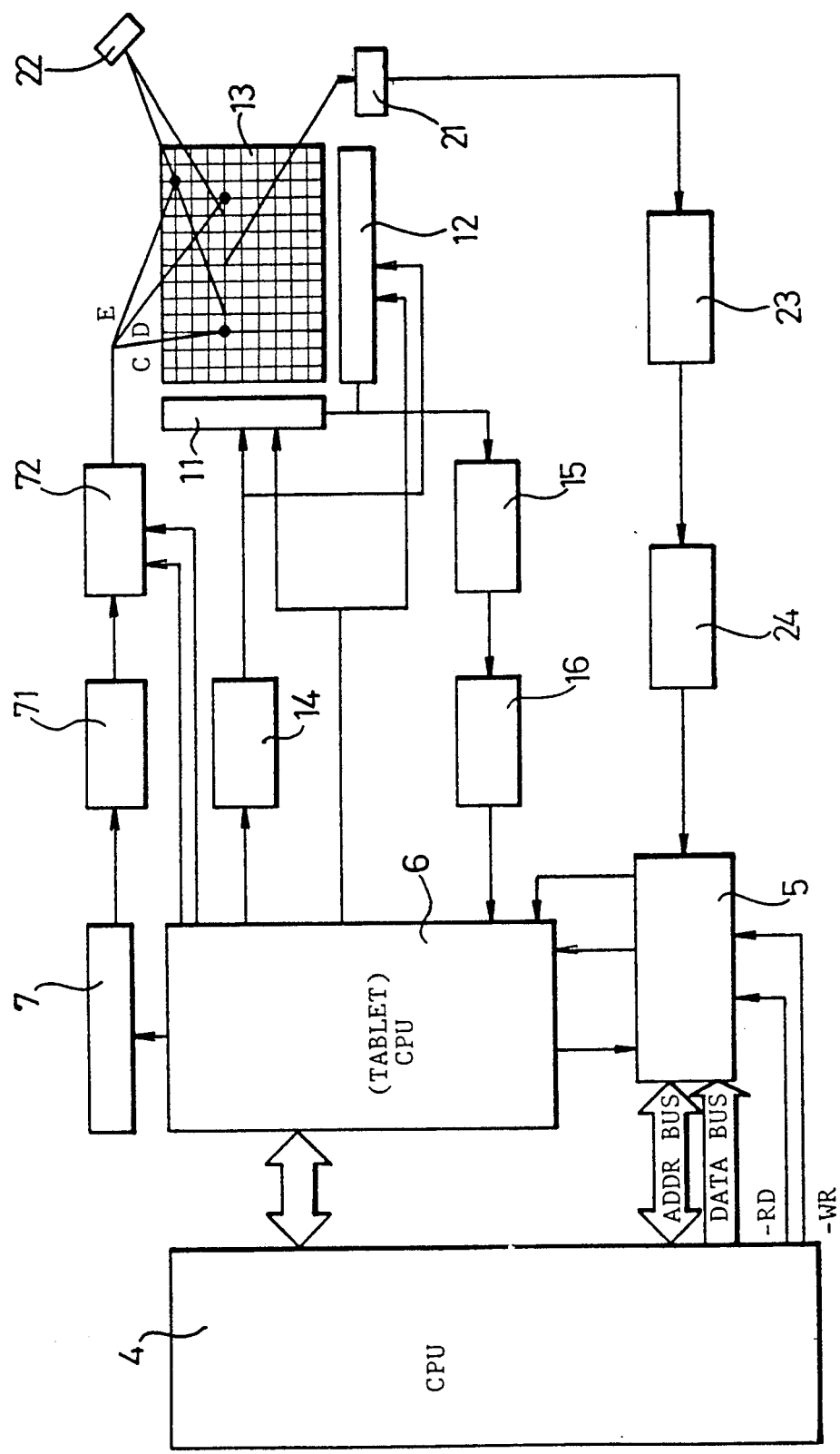
FIG. 2 is a circuit block diagram according to the present invention.

DETAILED DESCRIPTION OF THE PREFERRED EMBODIMENTS:

Referring to FIG. 1, a scanner system of the present invention generally comprises a tablet (1), a scanner (2), a stylus (or cursor control mouse) (3) and a main frame (4). Referring to FIG. 2, the scanner (2) comprises two oscillators —C and D coil— at both sides of the light source thereof, and a CCD (21). The stylus (3) comprises an oscillator E coil. The tablet (1) comprises a vertical-axis multiplex circuit (11) and a horizontal-axis multiplex circuit (12) to form a plane of circuit (13). The main frame (4) gives an instruction to an input/output circuit (5) for selection, and the signal is sent through a tablet CPU (6), an oscillation circuit (7), a frequency filtration circuit (71) and a decoder circuit (72) to drive the C.D coil or the E coil to start scanning. The tablet (1) is also controlled by the main frame (4). The instruction signal from the main frame (4) is sent through the input/output circuit (5) and the tablet CPU (6) to the plane of circuit (13) of the vertical-axis multiplex circuit (11) and the horizontal-axis multiplex circuit (12) via a multiplex decoder circuit (14). Therefore, the plane of circuit (13) can receive the induced current from the C.D. coil or the E coil for location identification (by means of ampere right-hand law). The induced current which is received by the plane of circuit (13) is then treated through a sample-and-hold amplifier circuit (15) and an A/D converter circuit (16) to feed back to tablet CPU (6) to provide X, Y coordinate data for further registration through the main frame (4). At the same time, the main frame (4) gives an output pulse to the scanner (2) to drive its light source (22) to project light on a reading target. The light projected on the reading target is reflected through glasses to the CCD (21) and sent through a scanning circuit (23) and an image digitizing circuit (24) to provide a digital data corresponding to the image scanned. The digital data and the X, Y coordinate data thus obtained are simultaneously sent to the main frame (4), and image registration scanning process is completed.

Figure 3:
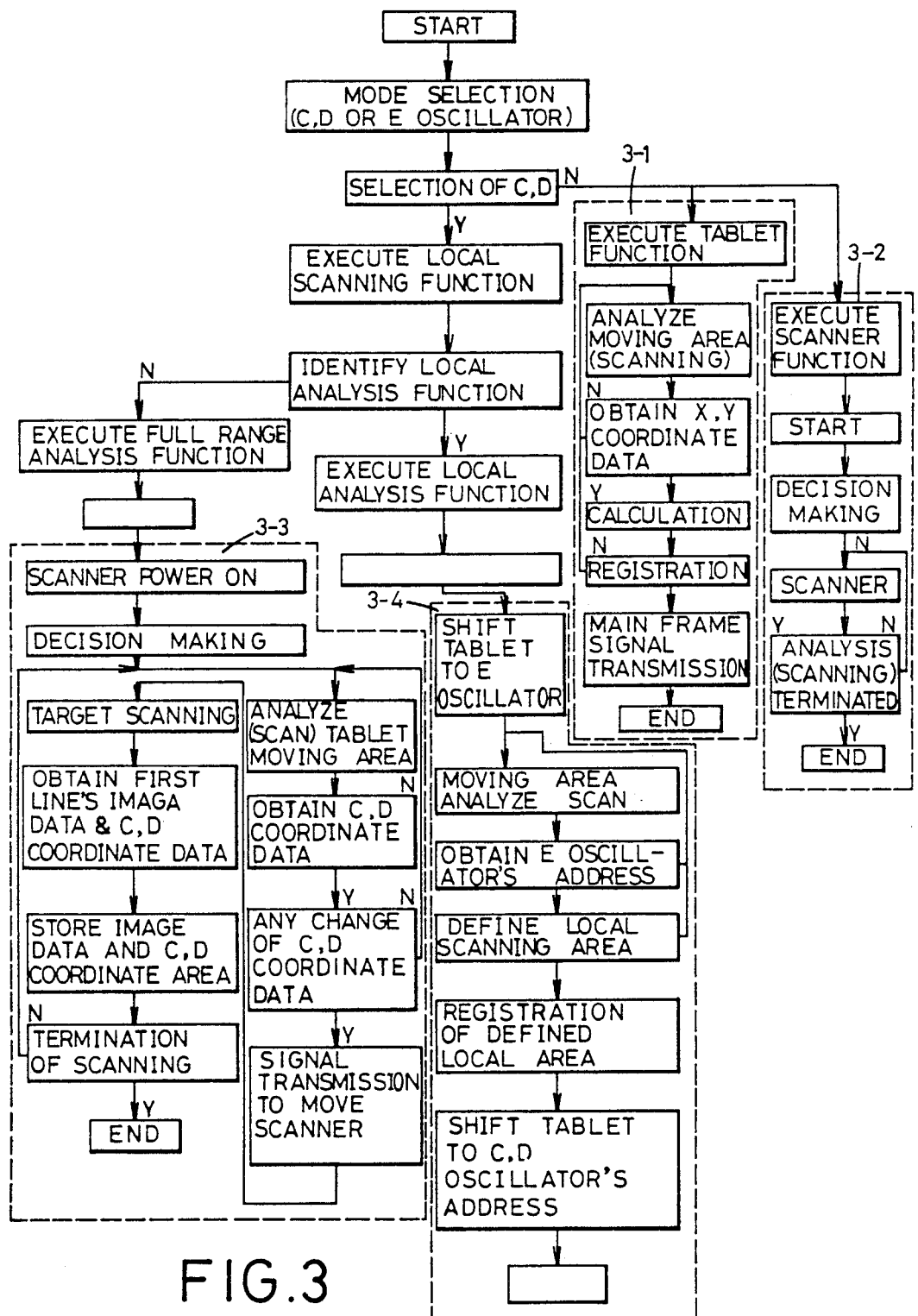
FIG. 3 is an operational flow diagram of the present invention.

Referring to FIG. 3, after scanning operation, the main frame will gives an instruction to the input/output circuit to select the C.D. coil of the scanner or the E coil of the stylus. If the E coil is selected to operate, the tablet and the scanner will operate separately. In FIG. 3, the block 3-1 indicates that the X, Y coordinate data which is obtained by the tablet from the plane of circuit (scanning circuit) is sent through the communication line of the main frame for communication transmission. The operation of the scanner is as illustrated in the block 3-2 of FIG. 3. The scanning movement is made through rollers. When the C.D. coil is selected, it shall be decided if to proceed with scanning function only. When "full range scanning function" is selected, it runs to the block 3-3. The input/output circuit gives a signal to the tablet CPU to shift its coil decoder circuit to the C.D. coil and then to start scanning. When a first line is scanned, the tablet immediately obtains C.D coordinate data from the scanning circuit, and the tablet CPU and the scanner respectively send the image data and the coordinate date of such a first line to the main frame. If the scanner is moved to a second line during scanning operation, it returns to tablet moving area. Through the tablet CPU, it can be detected that the C.D coil is moved. Then a pulse is sent to the scanner to drive it to move to such a second line so as to read the data of such a second line. And so on, a complete target image is scanned. After scanning of a complete target image, the image data and its coordinate data are stored in the memory of the main frame for further processing. When local scanning function is selected, it runs to block 3-4 immediately. As illustrated, the main frame gives an instruction to the tablet CPU via the input/output circuit, to shift its coil decoder circuit to the E coil (set in the stylus). The stylus is used to draw a circle to surround a region to scan so that the coordinate data corresponding to the selected region can be sent by the tablet CPU to the main frame. Thereafter, the input/output circuit sends a control signal to the tablet CPU to shift its coil decoder circuit to the C.D coil to perform the scanning operation as illustrated in block 3-3.

I claim:

1. A scanner system with local scanning capability for graphic reading, including:
    a tablet comprising a plane of circuit formed of horizontal and vertical multiplex circuits for scanning and controlled by a tablet CPU to indicate the corresponding location of an induced current, said induced current being treated through a sample-and-hold amplifier circuit and A/D converter circuit and sent to said tablet CPU to provide the corresponding coordinate data of the induced location;
    a scanner connected to said tablet CPU, comprising a plurality of oscillators at both sides by the light source thereof to induce an induced current on said plane of circuit permitting said plane of circuit to induce the X, Y coordinate data of patterns, characters and lines, said light source being to projecting light on a reading target for reflection an image of said reading target to a CCD through glasses to produce digital data corresponding to said image through the operation of a scanning circuit and a graphic digitizing circuit;
    a stylus connected to said tablet CPU, comprising an oscillator and being used to localize a preferred scanning region on said plane of circuit permitting said tablet to provide the coordinate data of the localized region; and
    a main frame comprising a CPU to process and store the digital data provided from said tablet CPU via an input/output circuit;
    characterized in that when said scanner is placed on said plane of circuit it obtains the X, Y coordinate data of the detected lines from the start to the end through its oscillators and simultaneously obtains the digital data of the image which is reflected from the reading target placed on said plane of circuit to said CCD by the light projected from its light source; when said scanner is moving on said plane of circuit its oscillators to move and the change of X, Y coordinate data is simultaneously detected by said tablet to drive said scanner to read the digital data of the new image detected for matching with the last digital data it obtained so as to modify any distorted graphic character.

2. The scanner system as claimed in claim 1, wherein said stylus (or cursor control mouse) is used to define a localized region on said tablet and drive said scanner to scan said localized region.

* * * * *